United States Patent

Campbell et al.

[15] 3,654,623

[45] Apr. 4, 1972

[54] BINARY MEMORY CIRCUIT WITH COUPLED SHORT TERM AND LONG TERM STORAGE MEANS

[72] Inventors: Eugene H. Campbell, Morgan Hill; James F. Kane, San Jose, both of Calif.

[73] Assignee: Signetics Corporation, Sunnyvale, Calif.

[22] Filed: Mar. 12, 1970

[21] Appl. No.: 18,952

[52] U.S. Cl. .........................340/173 CA, 307/238, 307/279, 340/173 FF

[51] Int. Cl. ..................G11c 9/00, G11c 11/24, G11c 11/40

[58] Field of Search ..................340/173 CA, 173 FF; 320/1; 307/238, 279

[56] References Cited

UNITED STATES PATENTS

| | | | |
|---|---|---|---|
| 3,576,571 | 4/1971 | Booher | 340/173 CA |
| 3,461,312 | 8/1969 | Farber | 307/238 X |
| 2,788,473 | 4/1957 | Breckman | 340/173 CA |
| 3,447,137 | 5/1969 | Fever | 340/173 FF |
| 3,322,974 | 5/1967 | Ahrons | 307/279 |
| 3,387,286 | 6/1968 | Dennard | 340/173 CA |
| 3,551,693 | 12/1970 | Burns | 307/279 X |

*Primary Examiner*—Bernard Konick
*Assistant Examiner*—Stuart Hecker
*Attorney*—Flehr, Hohbach, Test, Albritton and Herbert

[57] ABSTRACT

A binary memory circuit includes a short term memory having a capacitor coupled to a data bus by select and read and write field effect transistors. A long term memory element is also coupled to the capacitor and is in the form of a cross coupled inverter which includes gate-drain connected field effect transistors which act as load resistors in a pinch off mode for low power consumption. The switching time of the long term storage means is substantially longer than the rise time of the short term memory. The long term memory also restores or maintains any signal stored by the short term memory.

6 Claims, 3 Drawing Figures

INVENTORS
EUGENE H. CAMPBELL
JAMES F. KANE
BY
Flehr, Hohbach, Test, Albritton & Herbert
ATTORNEYS

BINARY MEMORY CIRCUIT WITH COUPLED SHORT TERM AND LONG TERM STORAGE MEANS

BACKGROUND OF THE INVENTION

The present invention is directed to a binary memory circuit and more specifically to a memory circuit which has both short term and long term storage.

In the past, storage devices or memory cells for circuits have provided high speed operation only at the sacrifice of greater power input. In other words, for fast static or long term storage it was necessary to provide devices which consumed relatively large amounts of power.

On the other hand, dynamic memories where storage was only temporary have been constructed which require little power but on the other hand, of course, do not provide long term static storage.

Ideally a memory circuit should have a rapid dynamic access and readout with long term dc storage capabilities and this should be accomplished with low power consumption. This is especially important in large capacity memory units where hundreds of individual circuits will be contained in a single circuit package as for example in large scale integration.

OBJECTS AND SUMMARY OF THE INVENTION

It is, therefore, a general object of the present invention to provide an improved binary memory circuit which provides high speed storage along with long term storage with a relatively low power input.

It is another object of the invention to provide an improved memory circuit as above which provides the speed advantages of capacitor storage along with the flexibility of long term dc storage.

In accordance with the above objects there is provided a binary memory circuit for storing two logic levels of a binary input logic signal. Short term storage means are responsive to the input logic signal to store the levels. These storage means have a relatively short response time to the logic signal. Long term Bistable switching means are coupled to the short term storage means and are responsive to the stored logic level of the signal to assume one of its two conditions corresponding to the stored logic level. The long term bistable switching means also maintains the storage of the logic level on the short term storage means. The switching means has a switching time relatively long compared to the rise time of the short term storage means.

DETAILED DESCRIPTION OF THE PREFERRED EMBODIMENT

Figure 1:
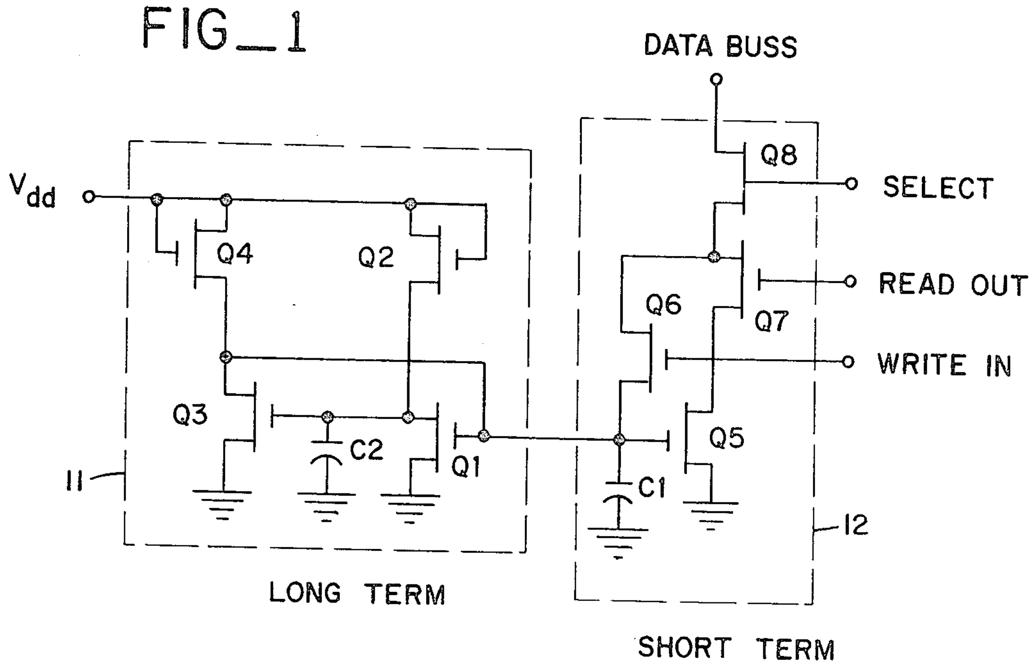
FIG. 1 is a schematic circuit diagram embodying the present invention.

The memory circuit of the present invention as illustrated in FIG. 1 includes a long term storage unit 11 containing field effect transistors Q1 through Q4 and a capacitor C2 and a short term storage unit 12 containing a storage capacitor C1 and field effect transistors Q5 through Q8. Short term storage unit 12 is coupled to a data bus and includes control terminals designated Select, Read Out and Write In. In an overall multi-unit memory cell, the Select input would be an X control line and the Read and Write control terminals Y control lines.

In operation, briefly, the Select input determines which of the memory circuits is to be utilized either for storing data or having data read out of it and the remaining two control lines determine the latter function.

Short term storage means which are responsive to an input logic signal having two levels, for example, "0" and "1," include the capacitor C1 which is coupled to one of the output terminals of field effect transistor Q6. The other output terminal of Q6 is series connected to an output terminal (source or drain terminal) of Q8 which has its other output terminal coupled to a data bus. To store information as to the level of the signal on the data bus, both Q8 and Q6 must provide a closed circuit to charge capacitor C1. Thus the Select input line to the gate of Q8 must be energized along with the Write In command to the gate of Q6. Information on the data bus is thereby transferred through the serially connected devices Q6 and Q8 to capacitor C1. Information is loaded in this manner in less than 50 nanoseconds. This is because of the relatively low value of capacitor C1 of from 0.4 to 0.5 picofarads and the connection of the field effect transistors Q6 and Q8 to operate in a heavily overdriven mode whereby the internal impedance is low providing for relatively rapid rise times. In fact, in general the rise time of the short term memory unit 12 is compatible with the input pulse width of the write in data command.

Information is read out of the storage capacitor C1 through the buffer unit Q5 which is serially connected to the read out transistor Q7 which in turn is serially connected to the select transistor Q8 coupled to the data bus. Readout occurs with a Read Out command to the gate of Q7 and a Select command to the gate of Q8. This readout may, of course, occur anytime after capacitor C1 has been initially charged with the reference level information.

In the present embodiment, a "0" reference level is taken as −1 ½ to a −2 volts impressed on C1 from the data bus and a "1" level is approximately −7 volts. The "1" level or −7 volts is obtained from $V_{dd}$ which is −12 volts, with the subtraction of voltage drops in the circuit.

Figure 2:
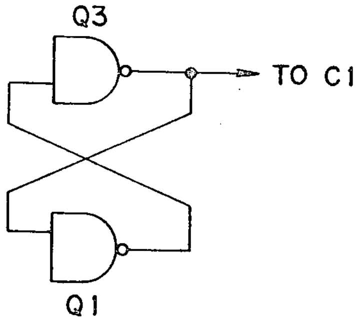
FIG. 2 is a logic diagram of a portion of the circuit of FIG. 1 showing it in simplified form.
Figure 3:
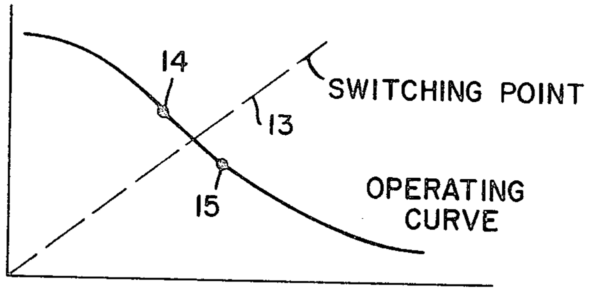
FIG. 3 is a curve useful in understanding the present invention.

Coupled to the storage capacitor C1 is long term storage unit 11. This unit is in the form of cross coupled inverters as schematically illustrated in FIG. 2 where Q1 and Q3 are in the form of field effect transistors and serve as inverters. Field effect transistor Q4 coupled to Q3 and Q2 coupled to Q1 serve in effect as load resistors with the latch or bistable switching circuit. The drain and gate of both Q4 and Q2 are coupled together to form an equivalent resistive circuit element. This is especially necessary in integrated circuits since a resistor of their equivalent resistance would be over 30 microns long, much too large a size for practical integrated circuits. Because of the above circuit connection, Q4 and Q2 operate in a pinch-off mode. This in essence allows for relatively low power operation since in view of the pinch-off mode characteristic the transistors Q2 and Q4 do not charge to the full supply voltage $V_{dd}$. Moreover, the pinch off-mode operation in conjunction with the use of relatively small geometries in the integration of Q1 and Q3 provides for a relatively shallow transition point in the operating curve of the switching device 11 as illustrated in FIG. 3. The switching point of the switch 11 is indicated as a line 13 and the two operating points on the operating curve as 14 and 15. In this manner the switching unit operater in the linear portion of a shallow transition curve and avoids operation between a cutoff condition and a high operating voltage which necessarily requires a large power input.

Because of the above operation of the long term storage unit or switching device 11 it necessarily has a relatively slow rise or switching time. For example, the switching time may be of the order of 50 to 100 microseconds. In order to compensate for this relatively long rise time, the short term storage 12 must be long enough to allow the long term storage to switch to the proper voltage level. This is accomplished by having the capacitor C1 retain its stored reference level for at least an equivalent amount of the switching time of switching unit 11. Thus, the discharge time of capacitor C1, which would normally occur through Q4, is relatively long compared to the switching time of unit 11. This switching time amounts to the propogation delay of the switching circuit which in effect is the time to turn off one of the field effect transistors Q3 or Q1 and turn the other one on. This is determined in substantial part by the stray capacitances in the circuit and additionally by the value of capacitor of C2 which is less than 1/10th of a picofarad.

Thus, in summary, it should be emphasized that in general the switching time of a circuit is determined by the amount of power supplied to that circuit. Specifically, in the case of the present long term storage switching circuit 11, with a relatively low amount of power input the circuit inherently has a relatively long switching time. However, the short term storage unit 12 compensates for this by maintaining the stored reference level on C1 a sufficient period of time to allow long term storage unit 11 to switch to the proper level and respond to the level stored in the capacitor C1. On the other hand the switching unit 11 when switched is capable of restoring information impressed on capacitor C1 and thus maintains long term DC storage.

In operation, for example, with capacitor C1 at a "0" reference level, which as discussed above is approximately a −1 ½ to 2 volts, transistor Q1 is off and Q3 on. With Q1 off the junction between Q1 and Q2 is at approximately −7 volts and the junction between Q3 and Q4 is at the "0" reference level of a −1 ½ to 2 volts. If a "1" reference level is now to be written into capacitor C1 the transistors Q8 and Q6 are closed to supply −7 volts to the capacitor C1. As discussed above C1 charges to almost full value in less than 50 nanoseconds. Q1 will then be turned on and Q3 off. The junction between Q3 and Q4 will now be approximately −7 volts to restore and maintain the "1" reference level voltage on capacitor C1.

Thus, the present invention provides an improved binary memory element which provides in integrated form a high speed memory cell which in addition has the capability of long term storage with low power consumption.

We claim:

1. A binary memory circuit for storing two logic levels of a binary input logic signal comprising: short term storage means including a capacitor and responsive to said logic signal to store said logic levels in said capacitor said storage means having a relatively short response time to said logic signal as determined by said capacitor; and bistable switching means permanently coupled to said short term storage means switchable between two conditions and directly responsive to the stored logic level of said logic signal in said storage means to assume a corresponding one of its two conditions and to maintain such stored level in said capacitor, the switching time of said switching means being long relative to said responsive time of said storage means said bistable switching means including cross coupled inverters coupled to a power supply each of said inverters being coupled to said power supply by separate resistor means.

2. A binary memory circuit as in claim 1 in which said storage means has a discharge time relatively long compared to said switching time of said bistable switching means.

3. A binary memory circuit as in claim 1 in which said bistable switching mans includes cross coupled inverters.

4. A binary memory circuit as in claim 1 in which resistor means are field effect transistors having their gate and drain terminals tied together.

5. A binary memory circuit as in claim 1 where said capacitor is coupled to a data bus through a first field effect transistor driven by a select command and a second series coupled field effect transistor driven by a write command.

6. A binary memory circuit as in claim 1 where all circuit components are integrated.

* * * * *